(12) United States Patent
Yamazaki

(10) Patent No.: US 11,759,982 B2
(45) Date of Patent: Sep. 19, 2023

(54) FOAM MOLDED PRODUCT, METHOD FOR PRODUCING FOAM MOLDED PRODUCT, AND MOLDING DIE STRUCTURE OF FOAM MOLDED PRODUCT

(71) Applicant: Archem Inc., Tokyo (JP)

(72) Inventor: Kouichirou Yamazaki, Tokyo (JP)

(73) Assignee: Archem Inc., Tokyo (JP)

( * ) Notice: Subject to any disclaimer, the term of this patent is extended or adjusted under 35 U.S.C. 154(b) by 530 days.

(21) Appl. No.: 16/760,077

(22) PCT Filed: Oct. 1, 2018

(86) PCT No.: PCT/JP2018/036726
§ 371 (c)(1),
(2) Date: Apr. 29, 2020

(87) PCT Pub. No.: WO2019/087647
PCT Pub. Date: May 9, 2019

(65) Prior Publication Data
US 2021/0370560 A1    Dec. 2, 2021

(30) Foreign Application Priority Data

Oct. 31, 2017  (JP) ................................. 2017-210872
Oct. 31, 2017  (JP) ................................. 2017-210888

(51) Int. Cl.
*B29C 44/12*     (2006.01)
*B29C 44/58*     (2006.01)
(Continued)

(52) U.S. Cl.
CPC .............. *B29C 44/12* (2013.01); *B29C 44/58* (2013.01); *B32B 1/00* (2013.01); *B32B 3/08* (2013.01);
(Continued)

(58) Field of Classification Search
CPC ............................. B29C 44/12; B29C 44/353
See application file for complete search history.

(56) References Cited

FOREIGN PATENT DOCUMENTS

JP    2005-125695 A    5/2005
JP    2007-82909 A     4/2007
(Continued)

OTHER PUBLICATIONS

International Search Report for PCT/JP2018/036726 dated Jan. 8, 2019 (PCT/ISA/210).

*Primary Examiner* — William P Watkins, III
(74) *Attorney, Agent, or Firm* — KENJA IP LAW PC

(57) ABSTRACT

A foam molded product capable of preventing generation of an underfill portion due to a concave portion and a convex portion formed on a surface of the foam molded product and suppressing increase in cost, a method for producing the foam molded product, a molding die structure of the foam molded product, and a vehicle seat pad using the foam molded product are provided. A foam molded product 10 formed by integrally molding a foam body 12 made of a foamable resin material M and including a shape deformation section 26 that is a concave strip or a convex strip on a surface, and a sheet-shaped support member 14 covering a surface opposing a formation face of the shape deformation section 26 of the foam body 12. In the support member 14 of the foam molded product 10, a projected portion 16 is provided in a region opposing the shape deformation section 26 and/or a vicinity of the region, and the projected portion 16 is in a columnar shape extending in an extending direction of the shape deformation section 26.

2 Claims, 12 Drawing Sheets

(51) Int. Cl.
B32B 5/18 (2006.01)
B32B 5/24 (2006.01)
B32B 1/00 (2006.01)
B32B 3/08 (2006.01)
B29K 105/04 (2006.01)
B29L 31/30 (2006.01)
B29L 31/00 (2006.01)
B60N 2/70 (2006.01)

(52) U.S. Cl.
CPC .............. B32B 5/18 (2013.01); B32B 5/245 (2013.01); B29K 2105/04 (2013.01); B29L 2031/3005 (2013.01); B29L 2031/771 (2013.01); B32B 2605/003 (2013.01); B60N 2/7017 (2013.01)

(56) References Cited

FOREIGN PATENT DOCUMENTS

| | | |
|---|---|---|
| JP | 2008-23084 A | 2/2008 |
| JP | 2008-183129 A | 8/2008 |
| JP | 2009-72916 A | 4/2009 |
| JP | 2010-17241 A | 1/2010 |
| JP | 2010-18058 A | 1/2010 |
| JP | 2010-22705 A | 2/2010 |
| JP | 2010-23403 A | 2/2010 |
| JP | 2011-201105 A | 10/2011 |

[Fig. 1]
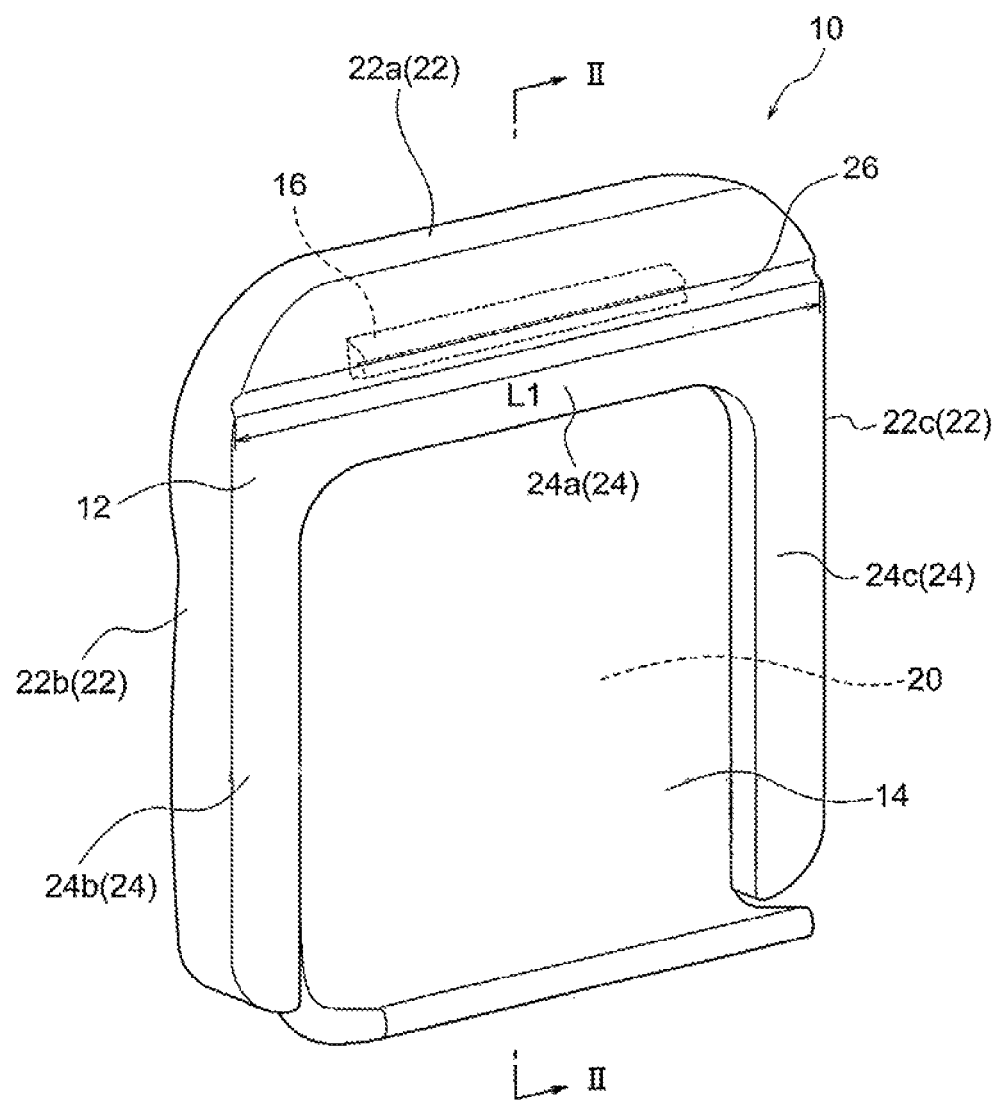

[Fig. 2 (a)]
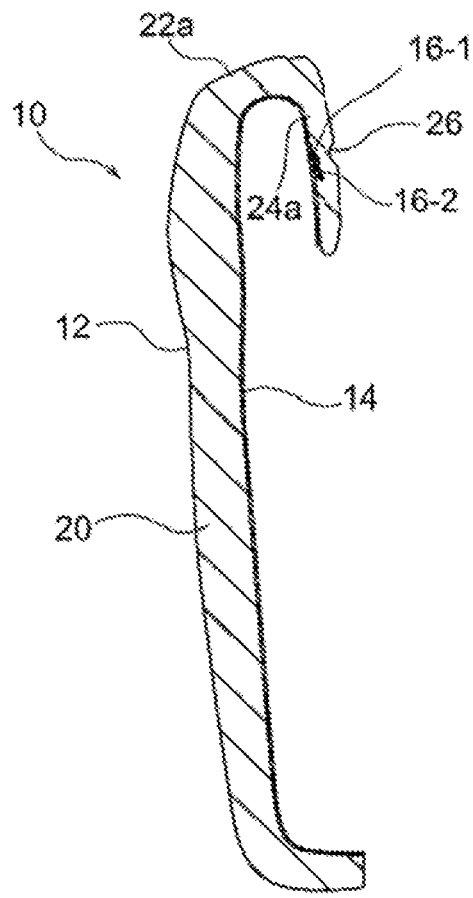
[Fig. 2 (b)]
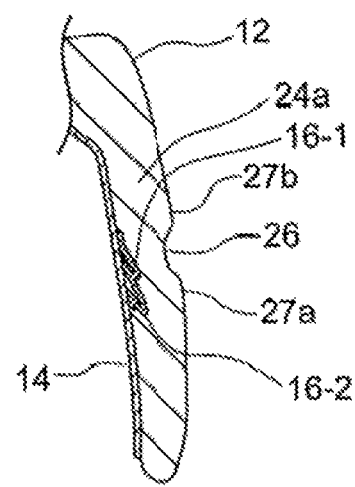

[Fig. 3]
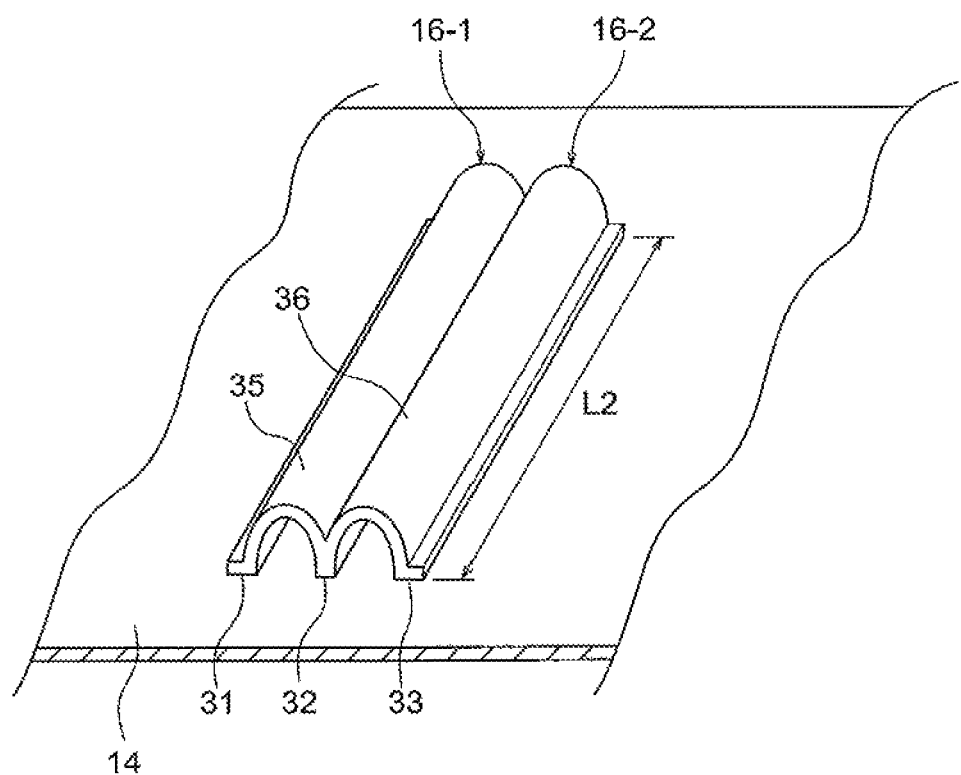

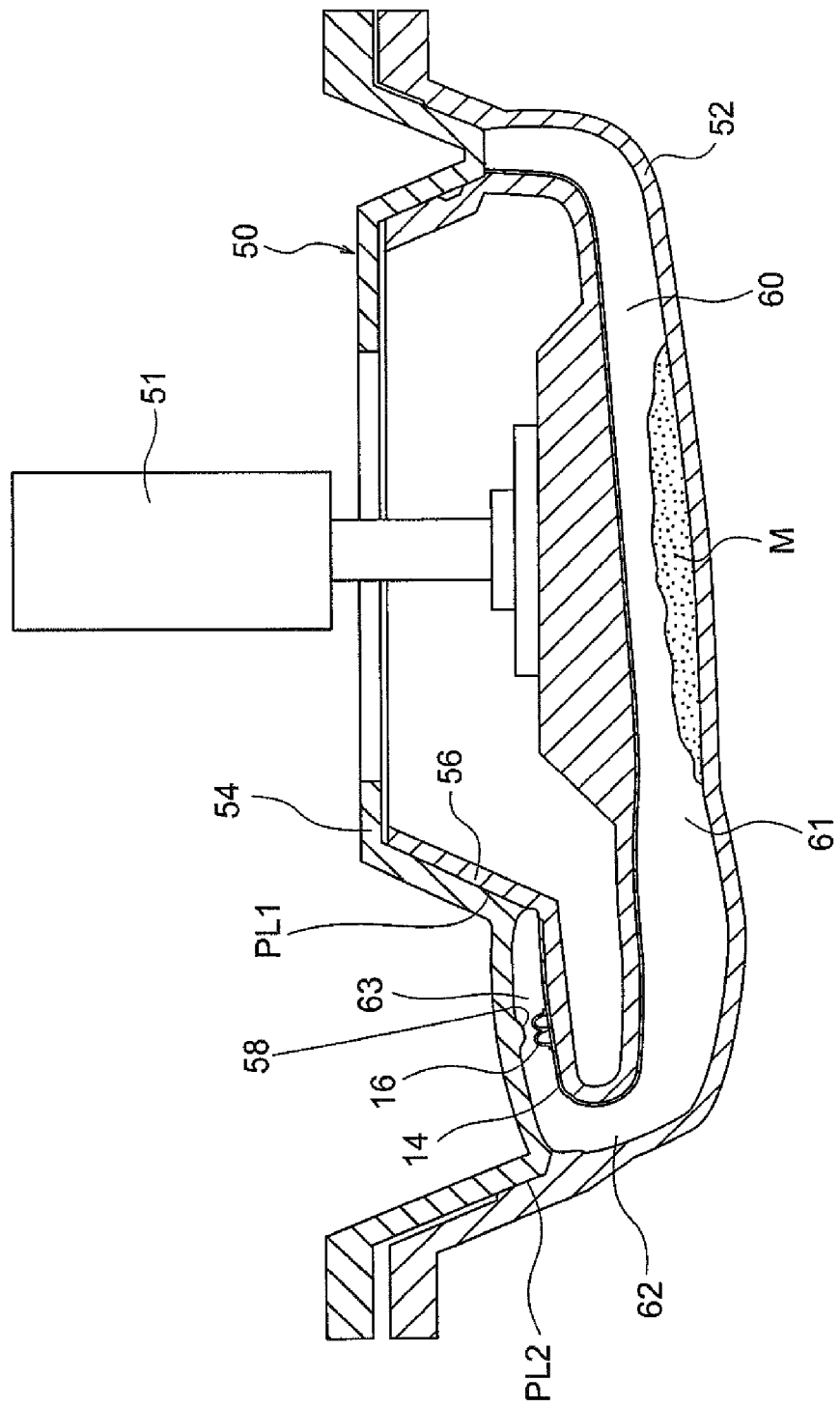

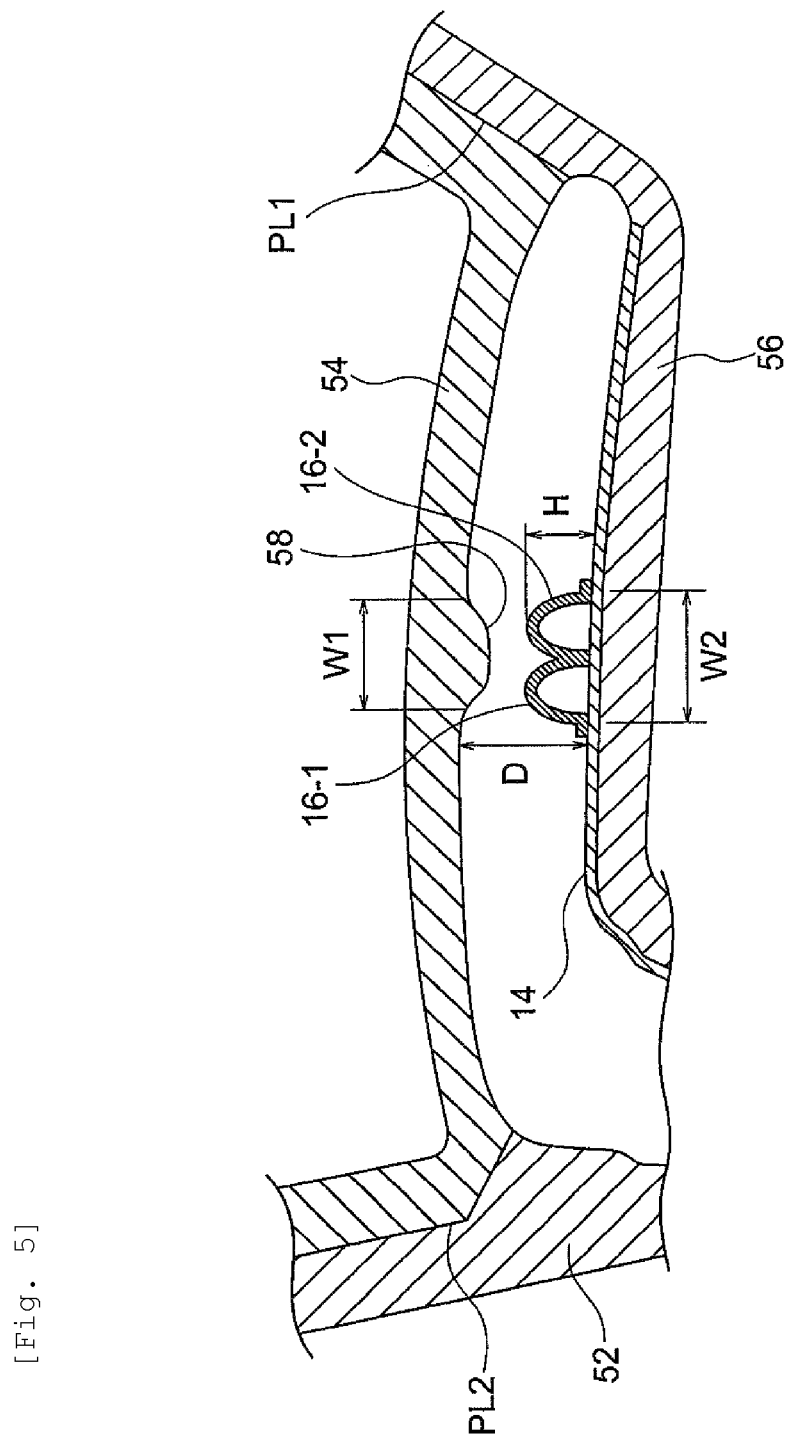
[Fig. 5]

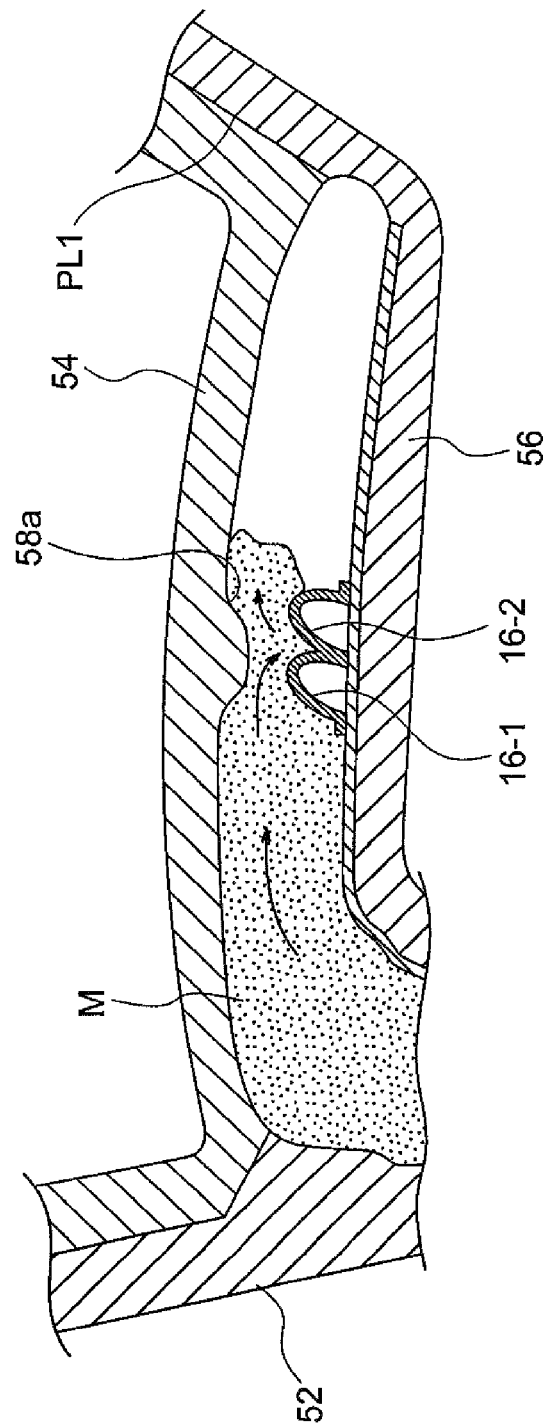
[Fig. 6]

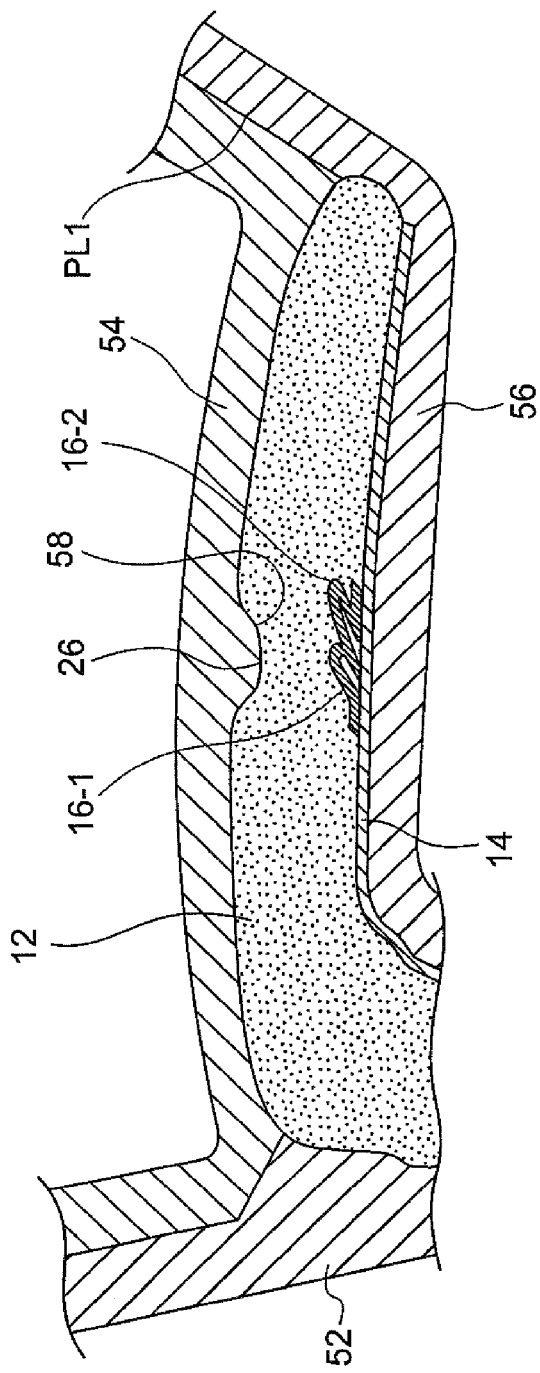
[Fig. 7]

[Fig. 8 (a)]
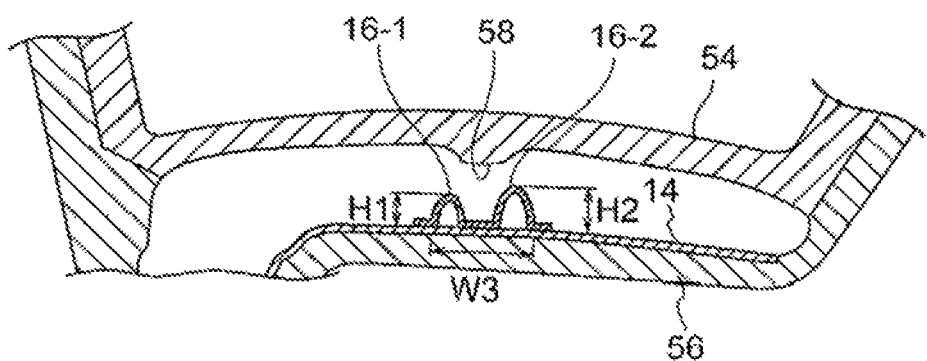
[Fig. 8 (b)]
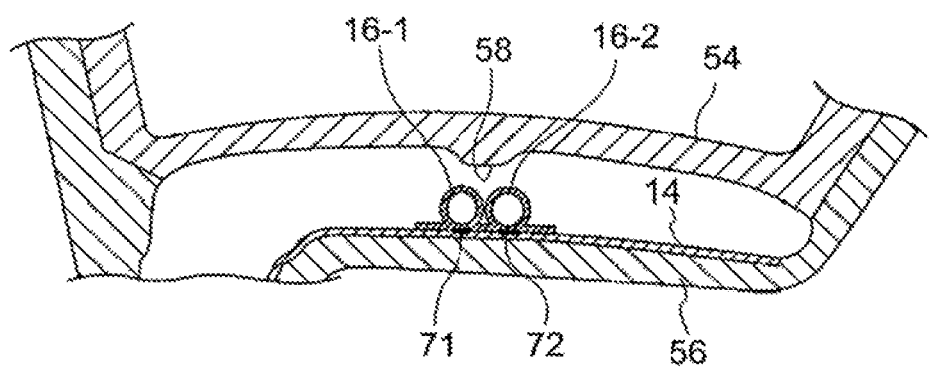

[Fig. 9]
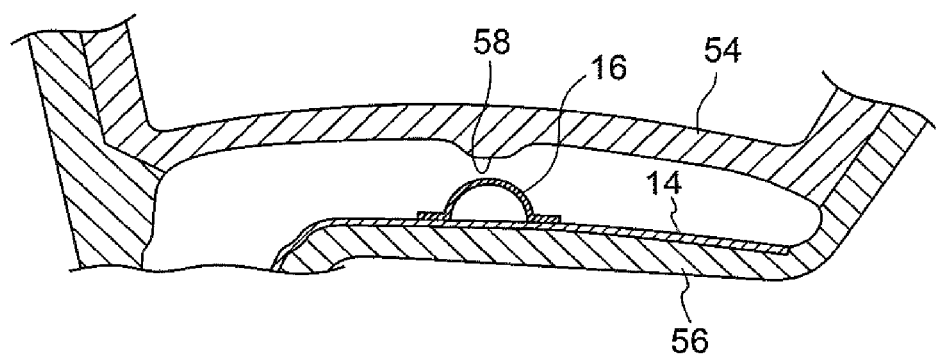
[Fig. 10]
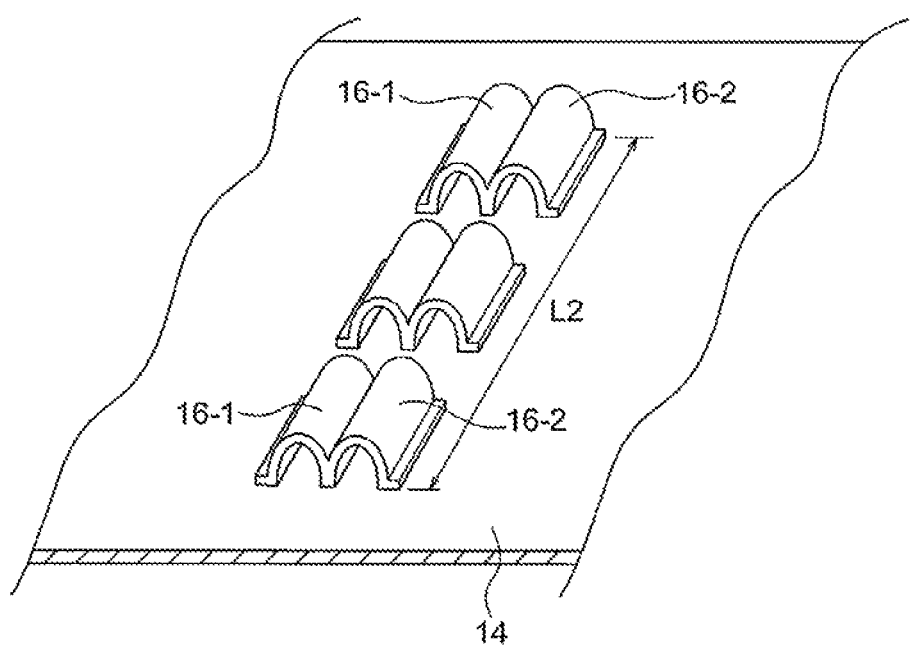

[Fig. 11 (a)]
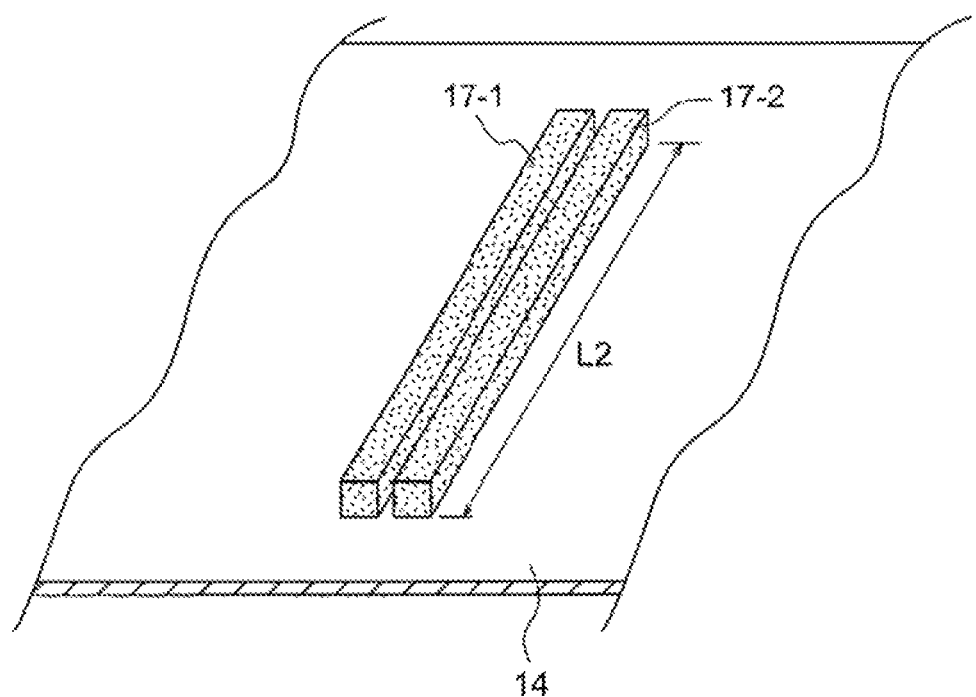
[Fig. 11 (b)]
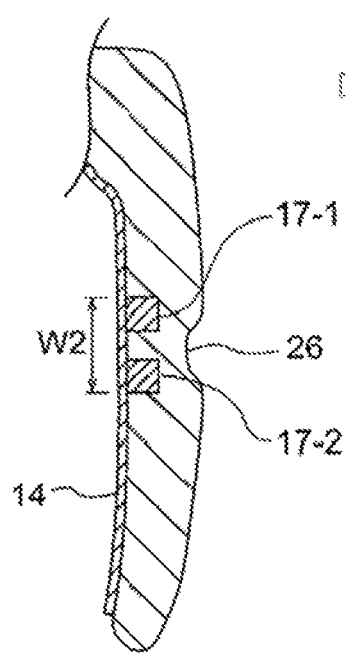

[Fig. 12]
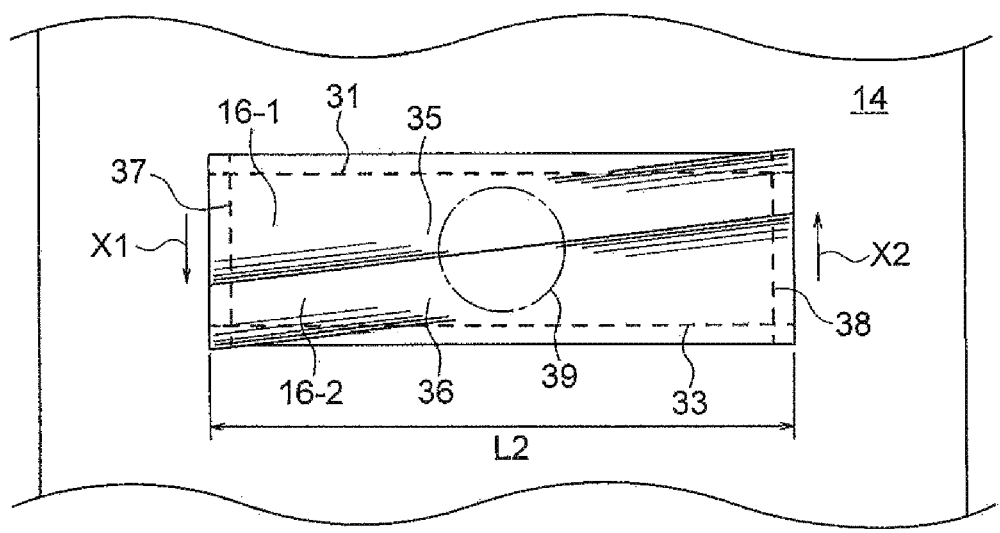

[Fig. 13 (a)]
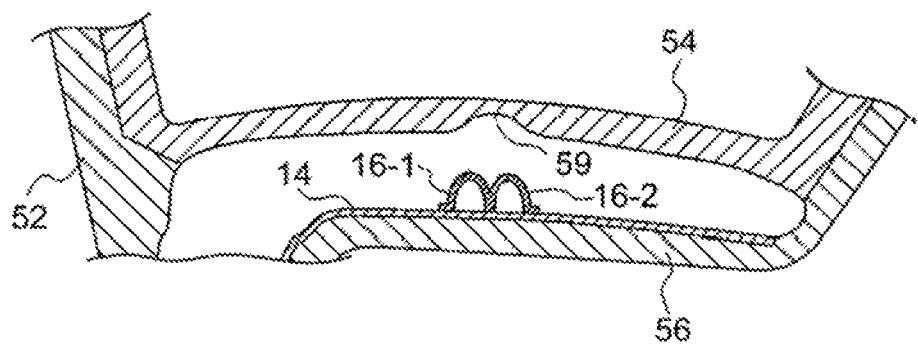
[Fig. 13 (b)]
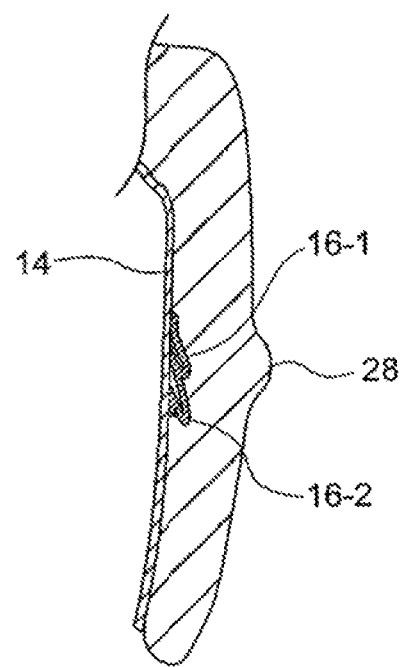

FOAM MOLDED PRODUCT, METHOD FOR PRODUCING FOAM MOLDED PRODUCT, AND MOLDING DIE STRUCTURE OF FOAM MOLDED PRODUCT

CROSS REFERENCE TO RELATED APPLICATIONS

This application is a National Stage of International Application No. PCT/JP2018/036726 filed Oct. 1, 2018, claiming priority based on Japanese Patent Application No. 2017-210888 filed Oct. 31, 2017, and Japanese Patent Application No. 2017-210872 filed Oct. 31, 2017.

TECHNICAL FIELD

The present invention relates to a foam molded product obtained by integrally molding a foam body and a support member, a method for producing the foam molded product and a molding die structure of the foam molded product.

BACKGROUND ART

A foam molded product of a polyurethane or the like having elasticity is used for a seat pad or the like used in a seat of a vehicle. Such a foam molded product includes, for example, a foam body made of a foamable resin material, and a support member that reinforces the foam body, and the foam body and the support member are integrally molded by injecting a liquid foamable resin material in a state where the support member is disposed in a cavity of a molding die, and foaming the foamable resin material.

In the integral molding, gas in the cavity is discharged outside from between mating faces of the molding die following advancement of the foamable resin material, but when the gas does not escape completely and remains in the cavity, an underfill portion is generated in a surface of the foam molded product.

The shape of the cavity of the molding die is determined by the shape of the foam molded product, and for example, in a vehicle seat pad or the like, a shape deformation section in a concave shape or a convex shape may be formed on the surface of the foam body. When the convex portion or the concave portion corresponding to the shape deformation section is provided in the molding die, flowability of the foamable resin material is inhibited by a level difference of the convex shape or the concave shape formed on an inner face of the molding die, and gas easily remains in a vicinity of the convex portion or the concave portion of the molding die, whereby an underfill portion is easily generated in the foam body.

As a countermeasure for suppressing generation of such an underfill portion, Patent Literature 1, for example, adopts a technique of disposing a support member inside of the molding die for forming a foam molded product, and providing a sheet-shaped flow direction adjustment fin that protrudes into the cavity, at an edge portion of the support member. The flow direction adjustment fin is installed at an upstream side in the flow direction of the foamable resin material, to the concave portion of the cavity.

PRIOR ART LITERATURE

Patent Literature

[Patent Literature 1] Japanese Patent Laid-Open No. 2005-125695

SUMMARY OF INVENTION

Problems to be Solved by the Invention

The technique described in Patent Literature 1 prevents an underfill portion from being generated in the concave portion by the foamable resin material colliding with the flow direction adjustment fin to direct the flow direction to the concave portion of the cavity.

However, the flow direction adjustment fin is in a single sheet shape, and therefore has a problem of easily falling down by the flow of the foamable resin material, and being unable to eliminate remainder of gas sufficiently.

Furthermore, the underfill portion of the foam molded product is generated in not only the concave portion formed in the cavity, but also the convex portion, and therefore a technique is required that can prevent generation of an underfill portion at low cost by suppressing generation of gas accumulation to both of the concave portion and the convex portion.

The present invention has been made in the light of the above described problems, and an object of the present invention is to provide a foam molded product capable of preventing generation of an underfill portion due to a concave portion or a convex portion formed on a surface of the foam molded product, and suppressing increase in cost, a method for producing the foam molded product and a molding die structure of the foam molded product.

Means for Solving the Problems

In order to attain the above described object, a method for producing a foam molded product according to the present invention is a method for producing a foam molded product, the method integrally molding a foam body made of a foamable resin material and a sheet-shaped support member by injecting the foamable resin material into a cavity and foaming the foamable resin material, the cavity being formed by a first die member including a die-face shape deformation section formed of a convex strip portion or a concave strip portion on an inner face of the first die member, and a second die member opposing the first die member and having the support member attached on an inner face of the second die member, the method including a step of providing a projected portion to the support member and attaching the support member onto the second die member, wherein the projected portion is in a columnar shape extending in an extending direction of the die-face shape deformation section, and is provided in a manner of protruding toward a side of the die-face shape deformation section, in a region in the support member opposing the die-face shape deformation section and/or a vicinity of the region.

According to the configuration, the step of providing the projected portion to the support member and attaching the support member onto the second die member is included, and the projected portion is in the columnar shape extending in the extending direction of the die-face shape deformation section, and is provided in the manner of protruding toward the side of the die-face shape deformation section, in the region opposing the die-face shape deformation section of the first die member and/or the vicinity of the region. Therefore, when the foamable resin material is injected into the cavity, the foamable resin material flows along the surface of the projected portion extending in the extending direction of the die-face shape deformation section, is sufficiently filled in the die-face shape deformation section of the convex strip or the concave strip, and can prevent gas from remaining. Accordingly, when the shape of the convex portion or the concave portion formed in the cavity is formed to be the convex strip or the concave strip extending in one direction, the foamable resin material can be sufficiently filled over the entire length of the convex strip or the concave strip. Further, since the projected portion has the columnar shape, the projected portion is difficult to push down even when the flowable foamable resin material abuts on the projected portion, and the effect of preventing gas accumulation is enhanced. Further, quality can be secured by preventing an underfill portion with the simple configuration in which the projected portion is formed into the columnar shape, and therefore production cost can be suppressed.

Further, a method for producing a foam molded product according to the present invention is a method for producing a foam molded product, the method integrally molding a foam body made of a foamable resin material and a sheet-shaped support member by injecting the foamable resin material into a cavity and foaming the foamable resin material, the cavity being formed by a first die member including a die-face shape deformation section formed of a convex portion or a concave portion on an inner face of the first die member, and a second die member opposing the first die member and having the support member attached on an inner face of the second die member, the method including a step of providing a projected portion to the support member and attaching the support member onto the second die member, wherein the projected portion is in a columnar shape extending in one direction, and a plurality of the projected portions are provided in parallel in a manner of protruding toward a side of the die-face shape deformation section, in a region in the support member opposing the die-face shape deformation section and/or a vicinity of the region.

According to the configuration, the step of providing the projected portion to the support member and attaching the support member onto the second die member is included, and the projected portion is in the columnar shape extending in one direction, and the plurality of the projected portions are provided in parallel in the manner of protruding toward the side of the die-face shape deformation section, in the region opposing the die-face shape deformation section of the first die member and/or the vicinity of the region. Therefore, when the foamable resin material is injected into the cavity, the foamable resin material flows in the wave form along the surface of the projected portions to be sufficiently filled in the die-face shape deformation section, and can prevent gas from remaining. Further, since the projected portion has the columnar shape, the projected portion is difficult to push down even when the flowable foamable resin material abuts on the projected portion, and the effect of preventing gas accumulation is enhanced. Further, quality can be secured by preventing an underfill portion with the simple configuration in which the projected portion is formed into the columnar shape, and therefore production cost can be suppressed.

More preferable modes of the invention of the production methods are as in (1) and (2) described below.

(1) Both ends of the projected portion are sewn to be twisted.

According to the configuration, it is possible to adjust the projected portion to be projected highest in a location where an underfill portion is easily generated, in the extending direction of the die-face shape deformation section. Thereby, gas elimination is efficiently performed, and generation of an underfill portion can be more suppressed.

(2) The foam molded product includes a shape deformation section of a concave strip or a convex strip formed by the die-face shape deformation section, and in a state where the foamable resin material is not injected, a height of the projected portion has a dimension of 30% to 70% of a thickness of the foam molded product in a vicinity of the shape deformation section.

According to the configuration, the height of the projected portion is set to be a suitable dimension to the thickness of the foam molded product, and therefore the effect of preventing gas accumulation can be more enhanced.

Further, a molding die structure of a foam molded product according to the present invention is a molding die structure of a foam molded product including a first die member including a die-face shape deformation section formed of a convex strip portion or a concave strip portion on an inner face of the first die member, and a second die member opposing the first die member and having a sheet-shaped support member attached on an inner face of the second die member, a foam body made of a foamable resin material and the support member being integrally molded by injecting the foamable resin material into a cavity formed by the first die member and the second die member and foaming the foamable resin material, wherein a projected portion is provided in a region in the support member opposing the die-face shape deformation section and/or a vicinity of the region, and the projected portion is in a columnar shape extending in an extending direction of the die-face shape deformation section.

According to the configuration, in the support member, the projected portion is provided in the region opposing the die-face shape deformation section of the first die member and/or the vicinity of the region, and the projected portion is in the columnar shape extending in the extending direction of the die-face shape deformation section. Therefore, when the foamable resin material is injected into the cavity, the foamable resin material flows along the surface of the projected portion to be sufficiently filled in the die-face shape deformation section of the convex strip portion or the concave strip portion, and can prevent gas from remaining. Further, since the projected portion has the columnar shape, the projected portion is difficult to push down even when the flowable foamable resin material abuts on the projected portion, and the effect of preventing gas accumulation is enhanced. Further, quality can be secured by preventing an underfill portion with the simple configuration in which the projected portion is formed into the columnar shape, and therefore production cost can be suppressed.

Further, a molding die structure of a foam molded product according to the present invention is a molding die structure of a foam molded product including a first die member including a die-face shape deformation section formed of a convex portion or a concave portion on an inner face of the first die member, and a second die member opposing the first die member and having a sheet-shaped support member attached on an inner face of the second die member, a foam body made of a foamable resin material and the support member being integrally molded by injecting the foamable resin material into a cavity formed by the first die member and the second die member and foaming the foamable resin material, wherein a projected portion is provided in a region in the support member opposing the die-face shape deformation section and/or a vicinity of the region, and the projected portion is in a columnar shape extending in one direction, and a plurality of the projected portions are provided in parallel.

According to the configuration, in the support member, the projected portion is provided in the region opposing the die-face shape deformation section of the first die member and/or the vicinity of the region, the projected portion is in the columnar shape extending in one direction, and the plurality of the projected portions are provided in parallel. Therefore, when the foamable resin material is injected into the cavity, the foamable resin material flows in the wave form along the surface of the projected portions to be sufficiently filled in the die-face shape deformation section, and can prevent gas from remaining. Further, since the projected portion has the columnar shape, the projected portion is difficult to push down even when the flowable foamable resin material abuts on the projected portion, and the effect of preventing gas accumulation is enhanced. Further, quality can be secured by preventing an underfill portion with the simple configuration in which the projected portion is formed into the columnar shape, and therefore production cost can be suppressed.

Further, a foam molded product according to the present invention is a foam molded product formed by integrally molding a foam body made of a foamable resin material and including a shape deformation section that is a concave strip or a convex strip on a surface of the foam body, and a sheet-shaped support member covering a surface opposing a formation face of the shape deformation section of the foam body, wherein a projected portion is provided in a region in the support member opposing the shape deformation section and/or a vicinity of the region, and the projected portion is in a columnar shape extending in an extending direction of the shape deformation section.

According to the configuration, in the foam molded product formed by integrally molding the foam body made of the foamable resin material and the support member, the projected portion is provided in the region in the support member opposing the shape deformation section and/or the vicinity of the region, and the projected portion is in the columnar shape extending in the extending direction of the shape deformation section. Therefore, when the foam body is integrally molded with the support member by the foamable resin material, the foamable resin material flows along the surface of the projected portion to be sufficiently filled in the shape deformation section that is the concave strip or the convex strip, and can prevent gas from remaining. Further, since the projected portion has the columnar shape, the projected portion is difficult to push down even when the flowable foamable resin material abuts on the projected portion, and the effect of preventing gas accumulation is enhanced. Further, quality can be secured by preventing an underfill portion with the simple configuration in which the projected portion is formed into the columnar shape, and therefore production cost can be suppressed.

More preferable modes of the invention of the foam molded product are as in (3) to (7) as follows.

(3) The projected portion is made of a same material as the foam body or the support member.

According to the configuration, the projected portion is made of the same material as the foam body or the support member. Therefore, the member cost can be suppressed, and feeling of foreign matter by providing the projected portion can be reduced.

(4) The projected portion is formed by a single sheet-shaped member, and includes a first joint portion and a second joint portion that extend parallel in an extending direction of the shape deformation section, and a body portion having a substantially arc-shaped section and connecting the first joint portion and the second joint portion.

According to the configuration, the single sheet-shaped member is joined to the support member by the two joint portions, and the projected portion having the substantially arc-shaped section can be formed by the body portion connecting the respective joint portions. Therefore, the projected portion can be formed easily at low cost. Further, since the single body portion is joined to and supported at the support member by the two joint portions, the projected portion has the structure that does not easily fall down even when the projected portion is formed of the sheet-shaped member.

(5) The shape deformation section is formed to be a concave strip, and the projected portion is formed of a single sheet-shaped member and is in a cylindrical shape extending in the extending direction of the shape deformation section.

According to the configuration, since the shape deformation section of the foam body is the concave strip, and the projected portion is in the cylindrical shape extending in the extending direction of the shape deformation section, the cylindrical projected portion corresponding to the shape deformation section of the concave strip changes the flow of the foamable resin material, and can properly fill the foamable resin material and prevent generation of an underfill portion. Further, by forming the projected portion of the single sheet-shaped member, cost can be suppressed, and in the finished product, the cylindrical projected portion can be brought into the state crushed by the foamable resin material.

(6) The projected portion is formed within a length range of 30% to 80% of an entire length of the shape deformation section.

According to the configuration, the length of the projected portion is properly set correspondingly to the long shape deformation section, and therefore the effect of preventing generation of gas accumulation can be more enhanced.

(7) A width of the projected portion is larger than a width of the shape deformation section.

According to the configuration, the flow direction of the foamable resin material can be adjusted by the projected portion over an entire width dimension of the shape deformation section of the concave strip, and therefore generation of an underfill portion can be suppressed more reliably.

Further, a foam molded product according to the present invention is a foam molded product formed by integrally molding a foam body made of a foamable resin material and including a shape deformation section in a concave shape or a convex shape on a surface of the foam body, and a sheet-shaped support member covering a surface opposing a formation face of the shape deformation section of the foam body, wherein a projected portion is provided in a region in the support member opposing the shape deformation section and/or a vicinity of the region, the projected portion is in a columnar shape extending in one direction, and a plurality of the projected portions are provided in parallel.

According to the configuration, in the foam molded product formed by integrally molding the foam body made of the foamable resin material and the support member, the projected portion is provided in the support member, and the projected portion is in the columnar shape extending in one direction, and the plurality of the projected portions are provided in parallel in the region opposing the shape deformation section and/or the vicinity of the region. Therefore, when the foam body is integrally molded with the support member by the foamable resin material, the foamable resin material flows in a wave form along the surface of the projected portions to be sufficiently filled in the shape deformation section in the concave shape or the convex shape, and can prevent gas from remaining. Further, since the projected portion has the columnar shape, the projected portion is difficult to push down even when the flowable foamable resin material abuts on the projected portion, and the effect of preventing gas accumulation is enhanced. Further, quality can be secured by preventing an underfill portion with the simple configuration in which the projected portion is formed into the columnar shape, and therefore production cost can be suppressed.

More preferable modes of the invention of the foam molded product are as in (8) to (14) as follows.

(8) A plurality of the projected portions are made of a same material as the foam body or the support member.

According to the configuration, since the projected portion is made of the same material as the foam body or the support member, member cost can be suppressed, and feeling of foreign matter by providing the projected portion can be reduced.

(9) Between the projected portions adjacent to each other, a reinforcing structure that secures a raised state of the projected portions is formed.

According to the configuration, the raised state of the projected portions can be secured by the reinforcing structure, and therefore the foamable resin material can be more reliably filled to the shape deformation section side.

(10) The projected portions are formed in such a manner that opposing faces of at least two of the projected portions adjacent to each other contact each other.

According to the configuration, it is possible to secure the raised state of the respective projected portions by the opposing faces of the two projected portions that are in the contacting state, and it is possible to change the flow of the foamable resin material and fill the foamable resin material to the shape deformation section more reliably with the configuration which is simple and at low cost.

(11) The shape deformation section is a concave strip extending in one direction, and a plurality of the projected portions are formed of a single sheet-shaped member, are in cylindrical shapes extending in an extending direction of the shape deformation section and are disposed adjacently.

According to the configuration, the shape deformation section of the foam body is the concave strip, and the projected portions are in the cylindrical shapes extending in the extending direction of the shape deformation section. Therefore, generation of an underfill portion can be prevented by properly filling the foamable resin material by the cylindrical projected portions corresponding to the shape deformation section of the concave strip. Further, by forming the projected portions of the single sheet-shaped member, cost can be suppressed, and in the finished product, the cylindrical projected portions can be brought into the state crushed by the foamable resin material.

(12) The shape deformation section is the concave strip extending in one direction, and two of the projected portions are provided by the single sheet-shaped member, and include a first joint portion, a second joint portion and a third joint portion that extend parallel in the extending direction of the shape deformation section, a first body portion having a substantially arc-shaped section and connecting the first joint portion and the second joint portion, and a second body portion having a substantially arc-shaped section and connecting the second joint portion and the third joint portion.

According to the configuration, the single sheet-shaped member is joined to the support member by the three joint portions, and the two projected portions each having a substantially arc-shaped section can be formed by the two body portions connecting the respective joint portions. Therefore, it is possible to form the projected portions easily at low cost.

(13) An entire width dimension of the plurality of the projected portions parallel to each other is larger than a width dimension of the shape deformation section opposing the plurality of the projected portions.

According to the configuration, it is possible to adjust the flow direction of the foamable resin material over the entire width dimension of the shape deformation section by the plurality of the projected portions, and therefore, generation of an underfill portion can be more reliably suppressed.

(14) Heights of the two projected portions adjacent to each other are different from each other.

According to the configuration, it is made more reliable to fill the foamable resin material in the shape deformation section by making the heights of the projected portions different in accordance with the shape deformation section.

According to the present invention, it is possible to prevent generation of an underfill portion due to the concave portion and the convex portion formed on the surface of the foam molded product while suppressing cost.

BRIEF DESCRIPTION OF DRAWINGS

FIG. 1 is a perspective view illustrating a vehicle seat pad using a foam molded product that is one embodiment of the present invention.

FIG. 2(a) is a sectional view taken along line II-II in FIG. 1, and FIG. 2(b) is an essential part enlarged sectional view of FIG. 2(a).

FIG. 3 is a perspective view illustrating a state where projected portions are provided to a support member.

FIG. 4 is a sectional view illustrating a molding die.

FIG. 5 is an essential part enlarged view of the molding die illustrated in FIG. 4.

FIG. 6 is an essential part enlarged view explaining a production process of a seat pad, and similar to FIG. 5.

FIG. 7 is an essential part enlarged view explaining the production process of the seat pad, and similar to FIG. 5.

FIG. 8(a) and FIG. 8(b) are views explaining Modified Examples 1 and 2 of the projected portions in the seat pad.

FIG. 9 is a view explaining Modified Example 3 of the projected portion in the seat pad.

FIG. 10 is a perspective view illustrating Modified Example 4 of the projected portion, and similar to FIG. 3.

FIGS. 11(a) and 11(b) are views explaining Modified Example 5 of the projected portions, FIG. 11(a) is a perspective view illustrating a support member to which the projected portions are mounted, and FIG. 11(b) is an essential part enlarged sectional view of the seat pad.

FIG. 12 is a view explaining Modified Example 6 of projected portions 16, and is a plan view of the support member to which the projected portions are provided seen from above.

FIGS. 13(a) and 13(b) are views explaining a modified example of a seat pad, FIG. 13(a) is an essential part enlarged view similar to FIG. 5, and FIG. 13(b) is an essential part enlarged sectional view of the seat pad.

MODE FOR CARRYING OUT THE INVENTION

The following embodiment is described by taking a vehicle seat pad 10, in particular, a seatback pad of a seatback portion of a front seat of an automobile as an example of a foam molded product. Note that the present invention can be applied to a foam molded product including a foam body made of a foamable resin material, and a support member that is formed integrally with the foam body, without being limited to the vehicle seat pad.

FIG. 1 is a perspective view of a seatback pad of a front seat that is the vehicle seat pad 10 using a foam molded product that is one embodiment of the present invention seen from a rear side, FIG. 2(a) is a sectional view taken along line II-II in FIG. 1, and FIG. 2(b) is an essential part enlarged sectional view of FIG. 2(a).

The vehicle seat pad 10 of the present embodiment includes a foam body 12 made of a foamable resin material, and a support member 14 that reinforces the foam body 12, and a projected portion 16 is provided to the support member 14.

The foam body 12 has a pad body portion 20 with a front side serving as a backrest portion which a back of an occupant hits, extending portions 22 extending rearward from an upper edge, and a left and right side edges of the pad body portion 20, and protruding portions 24 protruding from the extending portions 22 to a center side of a back face of the pad body portion 20. A gap is formed between the pad body portion 20 and the protruding portions 24. Note that in the following explanation, the extending portion 22 and the protruding portion 24 from the upper edge of the pad body portion 20 are referred to as an upper extending portion 22a and an upper protruding portion 24a, and the extending portions 22 and the protruding portions 24 from the left and right side edges of the pad body portion 20 are referred to as side extending portions 22b and 22c and side protruding portions 24b and 24c.

On a surface on an outer face side of the upper protruding portion 24a, a shape deformation section 26 in a concave shape as compared with a peripheral surface is formed. The shape deformation section 26 in the illustrated example is formed to be a concave strip extending rectilinearly in a lateral direction that is a width direction of the vehicle seat pad 10, and the concave strip extends across both a left and right ends of the upper protruding portion 24a. Note that in the present embodiment, the shape deformation section 26 is a portion concaved with a higher inclination angle than gradually curved surfaces 27a and 27b in a periphery of the shape deformation section 26, and a width dimension of the concave strip is set to be substantially constant in a lengthwise direction.

The support member 14 is a sheet-shaped cloth member, and is provided over substantially an entire inner side face 12a that is a back side surface of the foam body 12.

A plurality of projected portions 16 are provided to a region on an inner face of the support member 14 opposing the shape deformation section 26 and/or a vicinity of the region, and are further provided side by side in the width direction of the shape deformation section 26. The projected portion 16 is formed into a columnar shape that extends in the extending direction of the shape deformation section 26, and has a substantially arc-shaped section or a polygonal section. Here, the columnar shape has a meaning including a solid columnar shape, and a hollow columnar shape such as a cylindrical shape, and the substantially arc shape has a meaning including not only an arc shape, but also a circular shape, a semicircular shape, a convex curved face shape and the like.

In the present embodiment, the projected portions 16 are formed of a single sheet-shaped member of a same material as the support member 14, are in cylindrical shapes with substantially semicircular sections extending in the extending direction of the shape deformation section 26, and the two projected portions 16 are provided in a state where opposing faces contact each other, in a region opposing the shape deformation section 26. Further, as described later, the projected portions 16 may be in a state where the cylindrical shapes are crushed by being crushed by a foamable resin material in a foam molding process.

FIG. 3 is a perspective view illustrating a state where the projected portions 16 are provided to the support member 14. The two projected portions 16 are provided by a single sheet-shaped member (hereinafter, referred to as a projected portion sheet member). The projected portion sheet member has a first joint portion (first joint portion) 31, a second joint portion (second joint portion) 32 and a third joint portion 33, which are joined to the support member 14, a first body portion (body portion) 35 connecting the first joint portion 31 and the second joint portion 32, and a second body portion 36 that connects the second joint portion 32 and the third joint portion 33, the respective joint portions 31, 32 and 33 extend parallel in one direction, and the respective body portions 35 and 36 have substantially semicircular sections. In the respective joint portions 31, 32 and 33, the support member 14 and the projected portion sheet member are sewn up or bonded by an adhesive agent or the like. A first projected portion 16-1 is formed by the first body portion 35, and a second projected portion 16-2 is formed by a second body portion 36.

The two projected portions 16 can be formed easily at low cost by joining the single projected portion sheet member to the support member 14 by the three joint portions 31, 32 and 33, and forming the two projected portions 16-1 and 16-2 by the two body portions 35 and 36 connecting the respective joint portions in this way. Further, the projected portion sheet member is formed of the same material as the support member 14, the member cost can be reduced, and feeling of foreign matter caused by providing the projected portions 16 can be reduced. Though not illustrated, in the projected portion sheet member, both end portions of parts to be the joint portions 31, 32, and 33 may be provided with cutout portions serving as marks in sewing.

Between the adjacent projected portions 16-1 and 16-2, a reinforcing structure that secures a raised state of the respective projected portions 16 is formed. Thereby, in the foam molding process described later, it can be made difficult for the projected portions 16 to fall down by a foamable resin material M. In the present embodiment, the reinforcing structure that secures the raised state of the respective projected portions 16 is configured by bringing the opposing faces of the adjacent projected portions 16-1 and 16-2 into a state contacting each other, but a reinforcing sheet or the like may be separately added. By configuring the reinforcing structure by the projected portions 16 themselves, as in the present embodiment, cost can be reduced, and the structure can be simplified.

Further, a length L2 of each of the projected portions 16-1 and 16-2 is set at a length of 30% to 80% of a length L1 (see FIG. 1) of the shape deformation section 26. Further, the respective projected portions 16-1 and 16-2, and the shape deformation section 26 are disposed so that central portions in the lengthwise direction overlap each other. By properly setting the length of the projected portion 16 correspondingly to the long shape deformation section 26, an effect of preventing generation of gas accumulation can be more enhanced in the foam molding process described later.

Molding of the vehicle seat pad 10 is performed by providing the projected portions 16 to the support member 14 (projected portion providing process) as described above, and thereafter integrally molding the support member 14 and the foam body 12 by a molding die 50 as illustrated in FIG.

4. FIG. 4 illustrates a state where the support member 14 is attached in the molding die 50, the foamable resin material M is injected, and the molding die is clamped.

The molding die 50 includes a lower die 52, an upper die (first die member) 54, and a core (second die member) 56 that is disposed between the lower die 52 and the upper die 54, and is driven by a piston cylinder 51. The upper die 54 and the core 56 are connected to be openable and closable via support shafts (not illustrated) respectively with respect to one end side of the lower die 52. When the molding die 50 is brought into a clamped state illustrated in FIG. 5, a cavity 60 for molding the vehicle seat pad 10 is configured among molding faces of the respective dies. The vehicle seat pad 10 is molded in such a manner that a front surface faces the lower die 52.

The cavity 60 has a first space section 61 for molding the pad body portion 20, a second space section 62 for molding the extending portion 22, and a third space section 63 for molding the protruding portion 24. The first and second space sections 61 and 62 are mainly formed by the lower die 52 and the core 56, and the third space section 63 is formed by the upper die 54 and the core 56 that oppose each other.

On a molding face (inner face) of the upper die 54, a die-face shape deformation section 58 formed of a concave portion or a convex portion is formed. The die-face shape deformation section 58 is a portion formed into a concave shape or a convex shape corresponding to the shape deformation section 26 of the vehicle seat pad 10, and is formed to be a convex strip corresponding to the concave strip of the shape deformation section 26, in the present embodiment.

Next, a process of integrally molding the support member 14 to which the projected portions 16 are provided and the foam body by using the molding die 50 will be described.

First, the upper die 54 and the core 56 are opened with respect to the lower die 52, and the support member 14 is attached on a molding face (inner face) of the core 56 by using a sticking member such as a magnetic seal, for example (support member attaching step). At this time, the projected portions 16 are disposed in a region opposing the die-face shape deformation section 58 of the upper die 54 and/or a vicinity of the region to protrude to a die-face shape deformation section 58 side. In the present embodiment, the two cylindrical projected portions 16-1 and 16-2 are provided in a parallel state on a region opposing the die-face shape deformation section 58 to extend in the extending direction of the die-face shape deformation section 58. Note that a die release agent is coated on the molding faces of the respective dies in advance.

As illustrated in FIG. 5, an entire width dimension W2 of the plurality of projected portions 16-1 and 16-2 is preferably set to be larger than a width dimension of the die-face shape deformation section 58 (that is, a width dimension of the shape deformation section 26 of the vehicle seat pad 10). Further, a top portion (that is, a bottom portion of the shape deformation section 26 of the concave strip) of the die-face shape deformation section 58 of the convex strip is preferably disposed to be located between the two adjacent projected portions 16-1 and 16-2. Further, a height H of the projected portion 16 is set at a dimension of 30 to 70% of a thickness D of the cavity 60 in the vicinity of the die-face shape deformation section 58 (that is, a dimension of 30 to 70% of a thickness of a vicinity of the shape deformation section 26 of the vehicle seat pad 10).

Next, a predetermined amount of the foamable resin material M such as an urethane undiluted solution, for example, is injected to the molding face of the lower die 52 that forms the first space section 61 (material injection step).

Thereafter, as illustrated in FIG. 4, the upper die 54 and the core 56 are clamped in this state, and the foam resin raw material is foamed (die clamping step).

When the foamable resin material M foams in the first space section 61 and fills the first space section 61, the foamable resin material M is sequentially filled from the second space section 62 to the third space section 63 with advancement of the foaming (foam molding step). Gas in the cavity 60 is discharged outside from die parting lines (parting lines) PL1 and PL2 formed by mating faces of the respective dies.

As shown by arrows in FIG. 6, the foamable resin material M advances by flowing in a wave form along the surfaces of the respective projected portions 16 when the foamable resin material M passes between the die-face shape deformation section 58 and the projected portions 16. Thereby, the foamable resin material M is forced to flow toward the die-face shape deformation section 58, and gas is prevented from remaining in the vicinity of the die-face shape deformation section 58. Especially when the die-face shape deformation section 58 is in a convex shape, gas residue is easily generated in a recessed portion 58a formed at a downstream side of the convex shape, and as a result that the projected portions 16 are provided in the region opposing the recessed portion 58a, the foamable resin material M can be forced to flow to the recessed portion 58a.

As illustrated in FIG. 7, when the cavity 60 is filled by foaming of the foamable resin material M, the projected portions 16 in hollow cylindrical shapes are in a crushed state by foaming pressure of the foamable resin material M. The gas in the third space section 63 is sufficiently discharged from the die parting line PL1 of the upper die 54 and the core 56 at a cavity tail end portion. The die parting line PL1 is located closer to a tip end side of the protruding portion 24 than the projected portions 16.

In the vehicle seat pad 10 formed in this way, generation of an underfill portion in the shape deformation section 26 is prevented, and high product quality can be secured. In particular, since the projected portions 16 are formed into columnar shapes, the projected portions 16 are difficult to push down by flow of the foamable resin material M and have a structure difficult to crush, and therefore have a high effect of preventing gas residue. Further, when the die-face shape deformation section 58 of the upper die 54 extends in a direction to intersect the flow direction of the foamable resin material M as in the illustrated example, the gas residue can be effectively prevented over an entire length of the die-face shape deformation section 58 by forming the projected portions 16 to be long in the extending direction of the shape deformation section 26.

Further, by properly setting the height H and the width dimension W2 of the projected portion 16 according to the thickness of the cavity 60 and the width of the die-face shape deformation section 58, the effect of preventing gas accumulation can be more enhanced.

Further, since the projected portion 16 is made of soft cloth, feeling of foreign matter in the finished foam molded product is reduced. In the vehicle seat pad 10, the projected portion 16 may keep a raised state, but in a case where the projected portion 16 is formed to be relatively long or the like, the projected portion 16 may be in a crushed state when the foamable resin material M is filled in the cavity 60 as illustrated in FIG. 7, and in such a case, tactile sense of discomfort by presence of the projected portions 16 is more reduced.

Next, modified examples of the projected portions 16 will be described by using FIGS. 8(a) and 8(b) to FIGS. 11(a)

and 11(b), and a modified example of the shape deformation section 26 will be described by using FIG. 12. Note that in FIGS. 8(a) and 8(b) to FIG. 12, same elements as in the aforementioned embodiment are assigned with the same reference sings, and explanation thereof will be omitted.

Modified Example 1

FIG. 8(a) is a view explaining Modified Example 1 of the projected portions 16, and is an essential part enlarged view similar to FIG. 5 illustrating a state where a support member 14 is installed in the molding die. Projected portions 16-1 and 16-2 of Modified Example 1 are disposed by being separated from each other in a width direction (that is, a width direction of the shape deformation section 26 of the concave strip of the vehicle seat pad 10) of the die-face shape deformation section 58 of the convex strip. An entire width dimension W3 of each of the plurality of projected portions 16 is preferably larger than a width dimension W1 of the die-face shape deformation section 58. Further, the projected portion 16-2 at the downstream side in the flow direction of the foamable resin material is set to be higher than the projected portion 16-1 at the upstream side. Note that heights of the projected portions 16-1 and 16-2 may be same heights, or the projected portion at the downstream side may be set to be high. Further, heights H1 and H2 of the respective projected portions 16-1 and 16-2 preferably have dimensions of 30% to 70% of a thickness D of the cavity 60.

It is possible to prevent generation of an underfill portion more reliably by properly controlling the flow direction of the foamable resin material to the shape deformation section 26 by providing a plurality of projected portions 16 separately and changing the heights of the respective projected portions 16.

Modified Example 2

FIG. 8(b) is a view explaining Modified Example 2 of the projected portions 16, and is an essential part enlarged view similar to FIG. 5 illustrating a state where a support member 14 is installed in a molding die. In Modified Example 2, a plurality of projected portions 16-1 and 16-2 are respectively formed into cylindrical shapes having circular sections. The plurality of projected portions 16-1 and 16-2 are formed of a single sheet-shaped member, and the respective projected portions 16-1 and 16-2 are respectively formed to have circular sections and are sewn to the support member 14 by joint portions 71 and 72 that is a single piece continuing in the extending direction. A space between the respective joint portions can be not joined to the support member 14. By forming and joining the respective projected portions by the joint portions of the single piece in this way, cost can be more reduced.

Modified Example 3

FIG. 9 is a view explaining Modified Example 3 of the projected portion 16, and is an essential part enlarged view similar to FIG. 5 illustrating a state where a support member 14 is installed in a molding die. In Modified Example 3, a single projected portion 16 is provided with respect to a single shape deformation section 26. By adopting the single projected portion 16 in this way, a structure is more simplified, and member cost can be reduced.

Modified Example 4

FIG. 10 is a view explaining Modified Example 4 of the projected portions 16, and is a perspective view illustrating a state where a plurality of projected portions 16-1 and 16-2 are provided to the support member 14 similarly to FIG. 3. In Modified Example 4, the plurality of projected portions 16-1 and 16-2 arranged side by side in the width direction are disposed in a divided manner into a plurality of pieces in a lengthwise direction that is an extending direction of the shape deformation section 26. An entire length L2 of each of the divided projected portions 16 is preferably 30% to 80% of a length L1 of the shape deformation section 26. By adopting a form divided into the plurality of pieces with spaces left in the lengthwise direction in this way, member cost can be reduced. Further, the divided projected portions 16 can be properly disposed in necessary locations. For example, the projected portions 16 are not only disposed equidistantly, but also disposed densely in a location where gas accumulation easily occurs (for example, a central portion in the lengthwise direction of the shape deformation section 26), and can be disposed with larger spaces left in other parts.

Modified Example 5

FIGS. 11(a) and 11(b) are views explaining Modified Example 5 of the projected portions 17, FIG. 11(a) is a perspective view illustrating a support member 14 to which the projected portions 17 are provided and illustrates a state before integrally molded with the foam body 12, and FIG. 11(b) is an essential part enlarged sectional view of a vehicle seat pad 10 similar to FIG. 2(b). The projected portions 17 of Modified Example 5 are made of a same material as the foam body, are each formed into a rectangular parallelepiped that extends in the extending direction of a shape deformation section 26, and are mutually joined to the support member 14 on surfaces opposing the support member 14. The respective projected portions 17-1 and 17-2 extend substantially parallel in a state separated from each other. By forming the projected portions 17 from the same material as the material of the foam body 12, it is possible to reduce member cost, and to reduce tactile sense of discomfort by the projected portions 17 in the finished product.

Modified Example 6

FIG. 12 is a view explaining Modified Example 6 of the projected portions 16, and is a plan view of a support member 14 where the projected portions 16 are provided seen from above. Projected portions 16-1 and 16-2 of Modified Example 6 are sewn in such a manner that both end portions are twisted. In the illustrated example, top portions of the projected portions 16 are sewn by joint portions 37 and 38 in a state where one end portion and the other end portion of each of the top portions of the projected portions 16 are crushed to fall down in opposite directions (a direction of an arrow X1, a direction of an arrow X2). In a vicinity of a center position of twist (a region enclosed by an alternate long and short dash line 39 in FIG. 12), the projected portions 16-1 and 16-2 are raised and have a highest height. By forming twist of the projected portions 16 in this way, the heights of the projected portions 16 can be changed in the extending direction, and by making the heights of the projected portions 16 highest in the location where an underfill portion is easily generated, for example, it becomes possible to suppress generation of the underfill portion effectively by enhancing the gas elimination effect during molding. Further, by sewing the projected portions 16 in such a manner as to twist the projected portions 16, it is possible to prevent the projected portions 16 from being crushed when the unused support member 14 before attached on the molding die 50 is folded and packaged. The center position of twist of the projected portions 16 may be adjusted freely in the extending direction by changing a sewing position or the like, for example.

Modified Example of Shape Deformation Section

FIGS. 13(*a*) and 13(*b*) are views explaining a modified example of a shape deformation section of a vehicle seat pad 10, and is an essential part enlarged view similar to FIG. 5. In the present modified example, a die-face shape deformation section 59 that is formed in an upper die 54 of a molding die 50 forming a shape deformation section 28 is formed into a concave shape, and more specifically, is formed to be a concave strip extending in one direction. A plurality of projected portions 16-1 and 16-2 are formed into cylindrical shapes extending in an extending direction of the shape deformation section 28 of a convex strip.

Note that the present invention is not limited to the embodiment and the modified examples described above, but various changes can be made within the range without departing from the gist of the invention. For example, at least one of the projected portions 16 can be provided, or a configuration in which three or more projected portions 16 are provided may be adopted. Further, the configurations shown in the embodiment and the respective modified examples described above can be applied by being properly combined.

REFERENCE SIGNS LIST

10 Vehicle seat pad
12 Foam body
14 Support member
16 Projected portion
20 Pad body portion
22 Extending portion
24 Protruding portion
50 Molding die
52 Lower die
54 Upper die
56 Core
58 Die-face shape deformation section

The invention claimed is:

1. A foam molded product formed by integrally molding a foam body made of a foamable resin material and including a shape deformation section that is a concave strip or a convex strip on a surface of the foam body, and a sheet-shaped support member covering a surface opposing a formation face of the shape deformation section of the foam body, wherein a projected portion is provided in a region in the support member opposing the shape deformation section and/or a vicinity of the region, and the projected portion is in a columnar shape extending in an extending direction of the shape deformation section, the projected portion is sewn to the support member in a state where one end portion and the other end portion of a top portion of the projected portion in an extending direction of the projected portion are crushed to fall down in opposite directions, and the projected portion has a highest height from the support member in a vicinity of a center position of the projected portion in the extending direction.

2. A foam molded product formed by integrally molding a foam body made of a foamable resin material and including a shape deformation section in a concave shape or a convex shape on a surface of the foam body, and a sheet-shaped support member covering a surface opposing a formation face of the shape deformation section of the foam body, wherein a projected portion is provided in a region in the support member opposing the shape deformation section and/or a vicinity of the region, the projected portion is in a columnar shape extending in one direction, each of the projected portions is sewn to the support member in a state where one end portion and the other end portion of a top portion of the each of the projected portions in an extending direction of the projected portion are crushed to fall down in opposite directions, the projected portion has a highest height from the support member in a vicinity of a center position of the projected portion in the extending direction, and a plurality of the projected portions are provided in parallel.

* * * * *